G. B. BREWER.
SIGNAL MACHINE.
APPLICATION FILED MAR. 23, 1921.
1,430,489.
Patented Sept. 26, 1922.
2 SHEETS—SHEET 2.
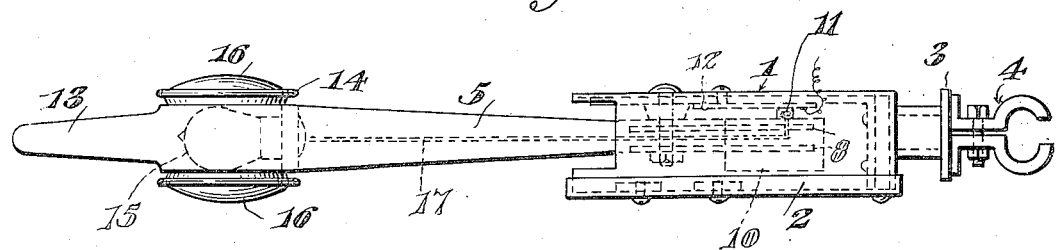
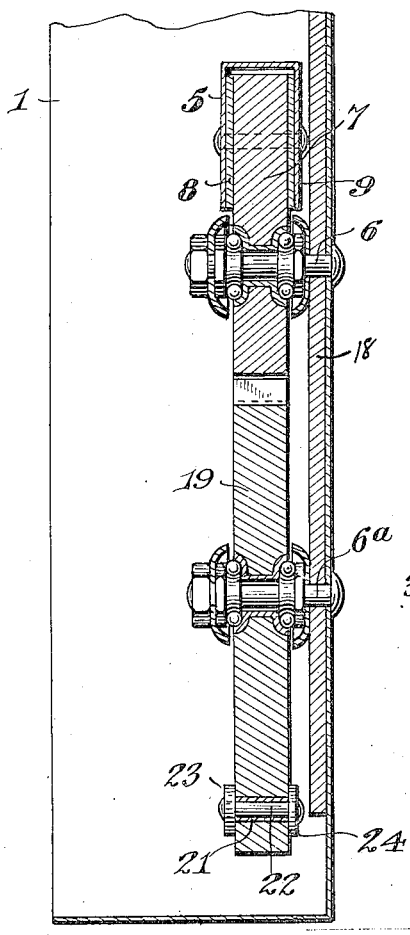
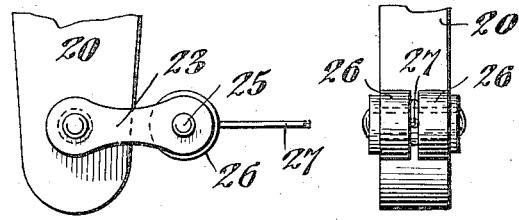
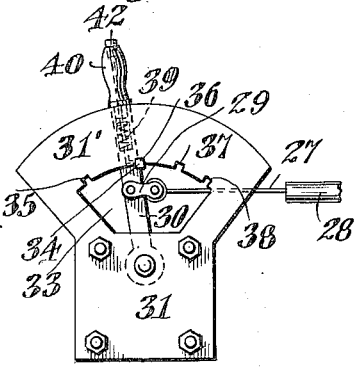
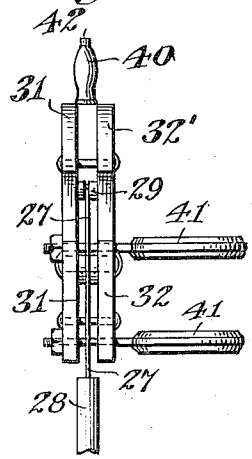
George B. Brewer, INVENTOR.
BY Geo. P. Kimmel
ATTORNEY.

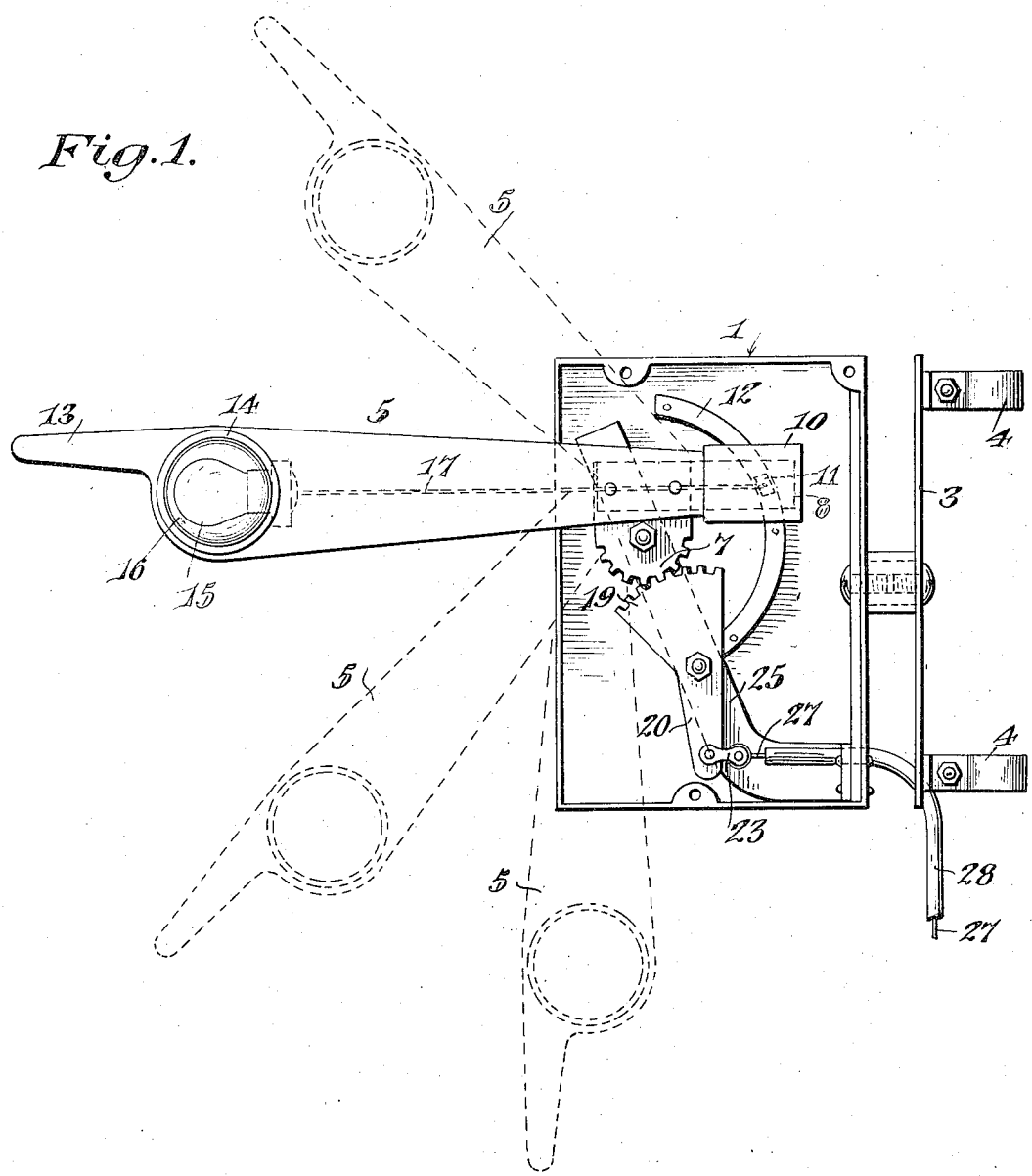

Patented Sept. 26, 1922.

1,430,489

UNITED STATES PATENT OFFICE.

GEORGE B. BREWER, OF SAN PEDRO, CALIFORNIA.

SIGNAL MACHINE.

Application filed March 23, 1921. Serial No. 454,940.

*To all whom it may concern:*

Be it known that I, GEORGE B. BREWER, a citizen of the United States, residing at San Pedro, in the county of Los Angeles and State of California, have invented certain new and useful Improvements in Signal Machines, of which the following is a specification.

This invention relates to signals and more particularly to an automobile signal for indicating the direction of the travel of the machine to an operator in the rear thereof.

The primary object of the invention resides in a manually operable signal preferably disposed at a position in proximity to the driver's seat of a motor vehicle whereby an indicating arm may be projected to various positions at the side or rear of the body to indicate the proposed direction of travel.

Another object of the invention resides in the provision of a detachable casing or housing having supporting braces therein for pivotally mounting an indicating arm and gearing therefor operable preferably from a position at the seat of the vehicle to indicate the proposed travel of the machine, that is to say to the right, left, stop or slow down positions.

Another and very important object of the invention is the provision of a signal designed and adapted for use on various types of motor vehicles, and one in which the parts are extremely simple in construction, easily assembled, rigid and durable, highly efficient in operation, practical and capable of being manufactured at a very low cost whereby its commercial possibilities are greatly enhanced.

The invention will be best understood from a consideration of the following detailed description taken in connection with the accompanying drawing forming a part of this specification, with the understanding, however, that the invention is not confined to any strict conformity with the showing in the drawing, but may be changed and modified so long as such changes and modifications mark no material departure from the salient features of the invention as expressed in the appended claims.

In the accompanying drawings:

Figure 1 is a side view showing the indicating arm in its various positions,

Fig. 2 is a plan view thereof,

Fig. 3 is a vertical section through the casing and gears for operating the indicating arm, Fig. 4 is a detail side elevation of the lower portion of the arm carrying the quadrant, showing the parts connected therewith;

Fig. 5 is an edge view thereof;

Fig. 6 is a detail side elevation of the hand operating lever for the indicator and the means for mounting it on a suitable support; and Fig. 7 is a top plan view thereof.

In the embodiment illustrated a casing 1 is shown of any desired configuration being here shown rectangular and which is equipped with a removable closure to afford access to the interior thereof. This casing 1 is mounted on a supporting plate or bracket 3 having vertically spaced laterally extending support engaging clamps 4 two of which are here shown and which are designed for clamping engagement with the wind shield of an automobile although obviously the device may be mounted on any other suitable support.

An indicator arm 5 extends through the outer side wall of the casing 1 which is open to provide for the reciprocation of said arm therein, the inner end of said arm being pivotally mounted within the casing on a bolt 6 carried by a segmental gear 7 which projects laterally and as here shown downwardly from said arm 5. This arm 5 is made substantially inverted U-shape in cross section as shown in Fig. 3 and straddles said gear 7 being riveted thereto. Arranged between the side members of the arm 5 and the opposed faces of the gear 7 are two plates 8 and 9 which extend longitudinally and rearwardly beyond the rear end of said arm 5 and support a weight 10 which operates as a balance for the arm 5. A spring contact wheel 11 is carried by the weight 10 and is designed to travel on a segmental brass strip 12 which is insulated from the casing 1 and is designed to be connected with the electric lighting system of the automobile in connection with which the device is used.

The hand 5 has a finger 13 at its outer end and at the base of said finger carries a housing 14 for an electric light bulb 15, said housing being equipped on opposite sides of said arm with glass lenses or closures 16 which may be of any desired color preferably red as is usual with devices of this character. This bulb 15 is connected by a suitable electric conductor 17 with the spring contact 11 carried by the weight 10 as shown clearly in Fig. 1 and by means of which current is carried to the light by a suitable switch not shown.

A supporting bracket 18 is riveted or otherwise secured to the inner side wall of the casing 1 and extends upwardly and forwardly at an oblique angle being located adjacent the closed side of the casing as is shown clearly in Figs. 1 and 2. The bracket 18 supports the hand or arm 5 by means of the pivot 6 which extends through the segmental gear 7 and it also supports a toothed quadrant 19 which meshes with the gear 7 and is mounted to rotate on a pivot 6ᵃ extending through the bracket 18 as is shown clearly in Figs. 1 and 3. Both of these gears 7 and 19 have a ball bearing connection with their pivots so as to operate easily with the least possible amount of friction. Extending from the quadrant 19 is an arm 20 in the lower end of which is mounted a wear sleeve 21 which forms a bearing for a pintle 22 which extends beyond opposite faces of the arm 20 and has mounted on said extended ends links 23 and 24. These links 23 and 24 are connected at their free ends by a pintle 25 carrying spaced rollers 26 between which is located an operating wire 27 which extends through a protecting steel tubular casing 28 and is connected at its other end with an operating lever 30 by links 29 in a manner similar to which the other end is connected with the quadrant arm 20.

This lever 30 is fulcrumed at one end between two plates 31 and 32 suitably held in spaced relation and between which the wire 27 passes and is connected with said lever at a point intermediate its ends. The upper portions of these plates 31 and 32 are made in the form of segments 31' and 32' having registering openings 33 therein the upper walls of said openings being arcuate in form as shown at 34 said arcuate wall being provided with a plurality of spaced notches 35, 36, 37 and 38 with which are designed to be engaged a laterally extending pawl or tooth 39 carried by the lever 30 so that said lever may be locked in adjusted position. The outer end of the lever 30 which projects beyond the perimeter of plates 31' and 32' is equipped with a hand grip 40 by means of which the lever may be shifted for controlling the position of indicator arm 5. These lever carrying plates 31 and 32 are equipped with clamps 41, two of which are here shown, for connecting them to the steering post of the automobile or to any other suitable support.

The gears 7 and 19 are preferably constructed of wood fibre but they may be composed of any suitable material.

From the above description it will be obvious that the signal arm or hand 5 may be swung and held in any desired position according to the position of the notches in the lever supporting plate and as shown four positions are provided for the arm one to extend it laterally at right angles to the casing as shown in full lines in Fig. 1 which indicates that the driver is about to turn to the left while the uppermost dotted line position indicates turning to the right and the intermediate dotted line position indicates slowing down while the lowermost position is that normally occupied by the hand when not in use.

The lever handle 40 is equipped with a push button 42 connected with the pawl or tooth 39 which is engaged normally with one of the notches in the plates 31' and 32'. The push button 42 is connected by a wire 43 with the dog 39 and has a spring 44 mounted thereon to exert its tension to normally hold said dog engaged with one of the notches it of course being understood that to release the lever all that is necessary is to depress the button 42 a sufficient distance to move the dog out of engagement with the notch and to permit the lever to be moved to position the dog in another notch.

In the use of this signal the casing 1 having been secured to the wind shield or other suitable support by means of clamps 4 and the lever carrying plates 31 and 32 connected by clamps 41 with the steering post of the car, all that is necessary to position the arm 5 in the desired position to indicate the proposed travel of the car is for the driver to release the lever and move it into the notch desired which movement will cause a pull or a push to be exerted on the wire 27 thereby rocking the toothed quadrant 19 which meshes with the gear 7 and through said meshing engagement swing the arm 5 in the desired direction.

The bulb with the glass housing therefor is of course designed for night use but may be used in the day time when it is desired to attract especial attention to the indicator.

The device is very simple in construction and should any of the parts become broken or out of place they may be readily repaired or replaced, access to the interior of the casing 1 being had by the removal of the closure 2.

In the accompanying drawings, I have illustrated my invention embodied in one form by way of example, and which in practice has been found to be highly satisfactory in obtaining the desired results. It will be obvious however that other embodiments may be adopted and that various changes and modifications of the same may be resorted to by those skilled in the art without departing from the spirit or scope of the invention. It is furthermore understood that the invention is not necessarily limited or restricted to the precise elements shown except insofar as such limitations are specified in the subject matter being claimed.

Having shown and described my invention, what I now claim as new and desire to secure by Letters Patent of the U. S. is:—

1. A casing adapted to be attached to a motor vehicle, a signal indicating arm pivotally mounted within the casing, with one end extending beyond the casing, a balancing weight carried by the inner end of said arm, a toothed segment carried by said arm, a toothed quadrant pivotally mounted in said casing and meshing with said segment, an operating element connected to the lower end of said toothed quadrant, and an actuating lever for operating said element whereby the indicating arm may be moved to various signalling positions.

2. A casing or housing adapted to be attached to the body of a motor vehicle, angular braces within the casing, a signal indicating arm pivotally mounted within the casing and between the braces, said arm extending outward of the casing and provided at its inner end with a balancing segment carried by said arm, a toothed weight, a depending toothed segment formed with said indicating arm, a toothed quadrant pivotally mounted between the braces and meshing with the segment, a flexible element connected to the lower end of said toothed quadrant, and an actuating lever for operating said flexible element whereby the indicating arm may be moved to various signalling positions.

In testimony whereof, I affix my signature hereto.

GEORGE B. BREWER.